(12) United States Patent
Hung (10) Patent No.: US 6,487,331 B2
(45) Date of Patent: Nov. 26, 2002

(54) MULTIPLE WAVELENGTH OPTICAL INTERFEROMETER SWITCH

(76) Inventor: Henry Hung, 4701 E. Marston Dr., Paradise Valley, AZ (US) 85253

( * ) Notice: Subject to any disclaimer, the term of this patent is extended or adjusted under 35 U.S.C. 154(b) by 0 days.

(21) Appl. No.: 09/867,032

(22) Filed: May 29, 2001

(65) Prior Publication Data

US 2002/0051602 A1 May 2, 2002

Related U.S. Application Data

(60) Provisional application No. 60/240,623, filed on Oct. 16, 2000.

(51) Int. Cl.$^7$ ................................................ G02B 6/16
(52) U.S. Cl. ........................................ 385/16; 359/110
(58) Field of Search ............................ 385/16–21, 147; 359/102, 107, 332, 189, 123, 139, 135, 110; 356/32

(56) References Cited

U.S. PATENT DOCUMENTS

| | | | | |
|---|---|---|---|---|
| 5,808,779 A | * | 9/1998 | Weis | 356/32 |
| 5,815,294 A | * | 9/1998 | Ishikawa et al. | 359/110 |
| 5,870,213 A | * | 2/1999 | Ishikawa et al. | 359/135 |
| 5,896,217 A | * | 4/1999 | Ishikawa et al. | 359/139 |
| 5,898,517 A | * | 4/1999 | Weis | 356/32 |
| 5,909,297 A | * | 6/1999 | Ishikawa et al. | 359/123 |
| 5,991,477 A | * | 11/1999 | Ishikawa et al. | 359/189 |
| 6,337,762 B1 | * | 1/2002 | Ueno | 359/332 |

* cited by examiner

*Primary Examiner*—Akm E. Ullah
(74) *Attorney, Agent, or Firm*—Squire, Sanders & Dempsey, L.L.P.

(57) ABSTRACT

Optical apparatus for selectively coupling optical wavelength components of wavelength multiplexed optical signals from an input port to an output port includes an interferometer coupled to the input and output port. The interferometer includes a first optical path and a second optical path. A plurality of optical phase modulators is arranged in said first path to include one optical phase modulator for each wavelength component. Each wavelength component is split into a wavelength component first portion on the first optical path and a wavelength component second portion on the second optical path. Each optical phase modulator is selectively operable to phase shift the corresponding one wavelength component first potion by first or second predetermined phase shifts, whereby the wavelength component is or is not coupled from the input port to the output port.

19 Claims, 12 Drawing Sheets

MULTIPLE WAVELENGTH OPTICAL INTERFEROMETER SWITCH

RELATED APPLICATIONS

This application claims the benefit of prior U.S. Provisional Patent application Ser. No. 60/240,623 filed Oct. 16, 2000.

FIELD OF THE INVENTION

This invention pertains to optical communications systems, in general, and to interferometers used in communications systems, in particular.

BACKGROUND OF THE INVENTION

An optical cross-connect device is functionally a four port device that works with optical signals comprising a plurality of different wavelengths. An optical cross-connect has an input port, a through port, an add port, and a drop port. Multiplexed wavelength optical signals at the input port are coupled to the through port. The use of add and drop ports allow optical signals at specific wavelengths to be "added" in place of the corresponding wavelength optical signals in the input port signals that in turn are switched to the drop port. This enables optical wavelength components signals to be added and dropped to/from multiplexed wavelength optical signals. An ideal optical cross-connect device is capable of dropping any combination of wavelengths from the input port to the drop port and adding any wavelengths combinations from an add port to the through port.

Wavelength routing optical cross-connect arrangements presently available separate incoming wavelengths received at inputs by utilizing DWDM demultiplexing. Typically large-scale optical switch matrices are utilized to switch and route the de-multiplexed single wavelength signals. In one arrangement micro-machined mirrors are utilized in what is referred to as MEM technology. In other arrangements, total internal reflection techniques are utilized with bubble or liquid crystal displays. These prior arrangements combine out-going wavelengths using DWDM multiplexers.

Optical switch matrices based on wavelength routing optical cross-connects have severe limitations. To provide for switching of multiplexed optical signals having "n" wavelengths, a complex nxn optical switch matrix must be utilized. Where "n" is a large number, the size of the matrix becomes very large and the cost to provide such a matrix is high. In addition, the insertion loss is also very high—typically in excess of 10 dB for a 64 wavelength optical cross-connect. Because the size of the matrix increases in accordance with the square of "n" it is also difficult to scale up for a matrix to handles larger numbers of wavelength channels. To provide a 256 wavelength optical cross-connect requires over 64,000 switching elements. In addition, such matrices typically operate at a relatively slow speed, on the order of 10 milliseconds. The slow speed is a result of utilizing some sort of mechanical movement. The mechanical movement itself leads to reliability issues.

SUMMARY OF THE INVENTION

In accordance with the principles of the invention, optical apparatus for selectively coupling optical wavelength components of wavelength multiplexed signals comprising wavelength components each at a predetermined wavelength selected from a plurality of predetermined wavelengths, from an input port to an output port is provided. The optical apparatus includes an interferometer coupled to the input and output ports. The interferometer includes first and second optical paths. Each wavelength component is split into a first wavelength component portion on the first path and a wavelength component second portion on the second path. A plurality of wavelength selective optical phase modulators is arranged in the first path and includes one optical phase modulator for each predetermined wavelength. Each modulator receives wavelength component first portions at a predetermined one wavelength. Each optical phase modulator is selectively operable to phase shift each corresponding wavelength component first portion by first or second predetermined phase shifts, whereby the corresponding wavelength component is or is not coupled from the input port to the output port.

In accordance with one aspect of the invention, a controller is coupled to each optical phase modulator and selects the first or said second predetermined phase shifts.

In accordance with another aspect of the invention, a de-multiplexer is disposed in the first path and couples each wavelength component from the first optical path to each corresponding one optical phase modulator.

In accordance with yet another aspect of the invention, a multiplexer is disposed in the first path and couples each optical wavelength component from each optical phase modulator to the first optical path.

In one embodiment of the invention, a multiplexer/de-multiplexer is disposed in the first path and couples each wavelength component between the first optical path.

In an embodiment of the invention, each corresponding one optical phase modulator and each optical phase modulator is a non-reciprocal phase shifter.

A method in accordance with the invention provides selective coupling of multiplexed wavelength components of optical signals comprising a plurality of multiplexed wavelength components from an input port to an output port. In accordance with the method the multiplexed wavelength components are coupled from the input port to an interferometer. Each wavelength component is split into a wavelength component first portion coupled onto a first optical path and a wavelength component second portion coupled onto a second optical path. A plurality of phase modulators is provided in the first path. Each wavelength component first portion is coupled to a corresponding one of said phase modulators. Each phase modulator is controlled individually to selectively subject each corresponding wavelength component first portion to a first or a second predetermined phase shift. Each wavelength component first portion is combined with each corresponding wavelength component second portion on a wavelength by wavelength basis to produce first or second interference states each having a predetermined relationship to the first or said second predetermined phase shift, whereby each wavelength component is coupled or is not coupled to the output port.

The method includes utilizing a controller to control each phase modulator. In accordance with one embodiment of the invention a step of utilizing a phase shifter for each said phase modulator is provided. In one particular embodiment, a non-reciprocal phase shifter is utilized for each phase modulator.

In accordance with one aspect of the invention, multiplexed wavelength components are separated into non-multiplexed wavelength components prior to coupling to a corresponding one of the phase modulators.

BRIEF DESCRIPTION OF THE DRAWING

The invention will be better understood from a reading of the following detailed description in conjunction with the drawing in which like reference designations are used in the various drawing figures to identify like elements, and in which.

DETAILED DESCRIPTION

Figure 1:
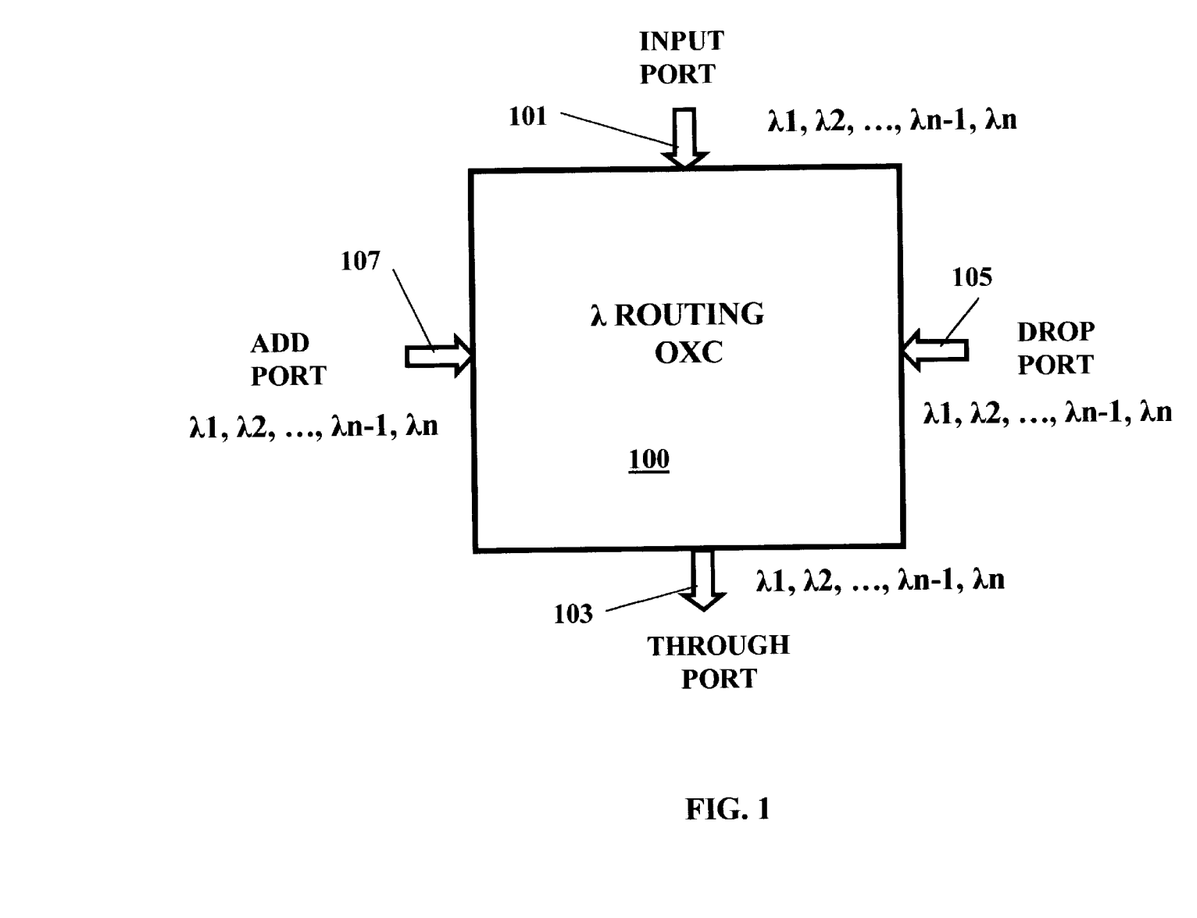
FIG. 1 is a block diagram illustrating wavelength routing optical cross-connect functions.

FIG. 1 illustrates the functionality of a wavelength routing optical cross-connect 100. Optical cross-connect 100 has an input port 101 that can receive a number, n, optical wavelength components $\lambda 1, \lambda 2, \ldots, \lambda n-1, \lambda n$. Optical cross-connect 100 can couple all of the wavelength components $\lambda 1, \lambda 2, \ldots, \lambda n-1, \lambda n$ to a through port 103. Selected wavelength components may be substituted for the wavelength components at through port 103 by via add port 107. In addition, any one or more of the wavelength components $\lambda 1, \lambda 2, \ldots, \lambda n-1, \lambda n$ may be "dropped" from the wavelength components transferred from input port 101 to through port 103 and outputted at drop port 105. Wavelength optical cross-connect 100 is capable of dropping any combination of wavelength components from input port 101 to drop port 105 and is capable of adding any wavelength component combinations from add port 107 to through port 103. Typically, when wavelength components are added, the corresponding wavelength components in the input optical signals are dropped.

Figures 2, 3:
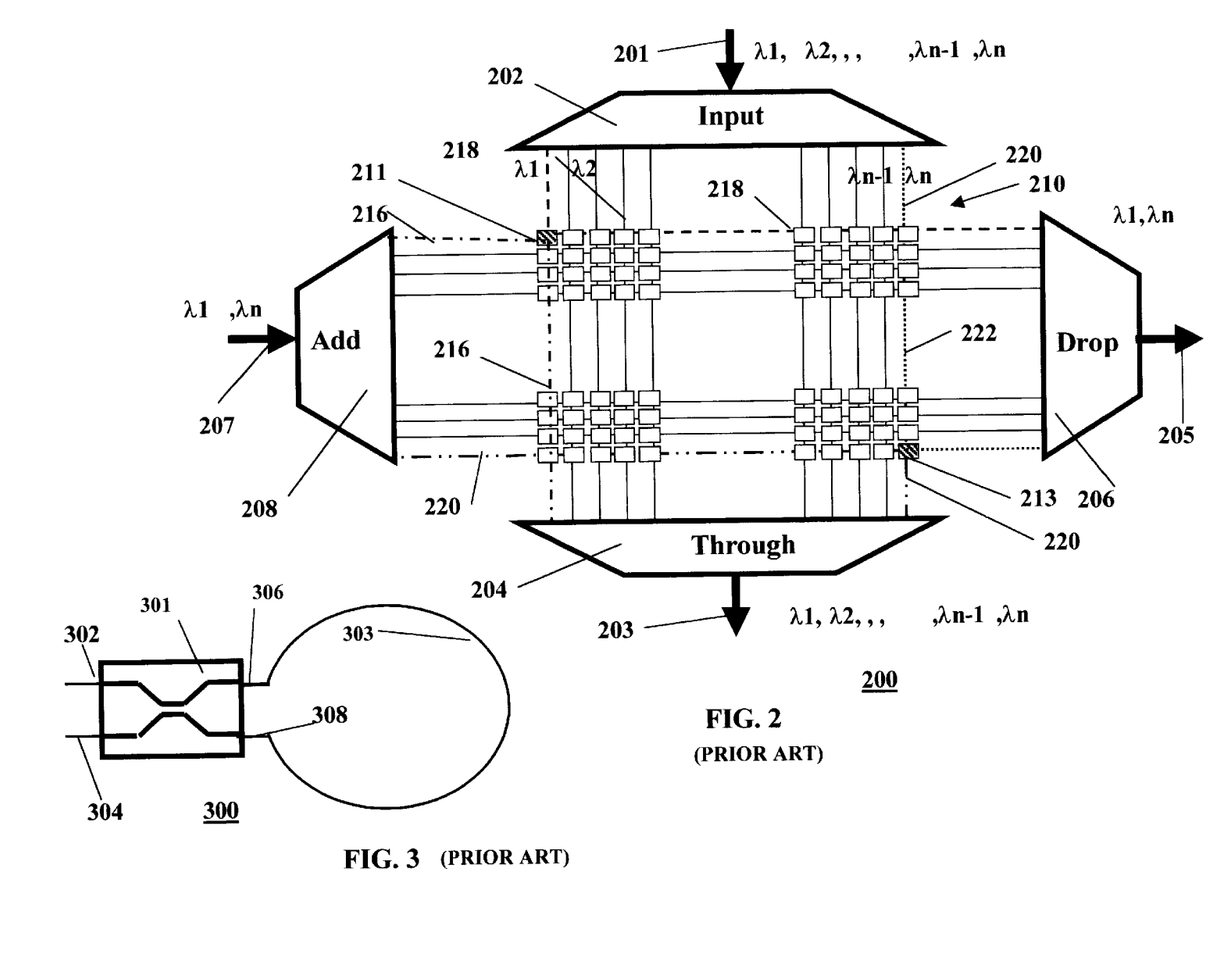
FIG. 2 is a block diagram illustrating a wavelength routing optical cross-connect utilizing prior art switch matrix technology.
FIG. 3 illustrates a prior art Sagnac interferometer.

FIG. 2 illustrates wavelength routing optical cross-connect 200 utilizing prior art switch matrix technology. An optical switch matrix 210 is utilized. To provide for "n" multiplexed wavelengths, a complex n×n optical switch matrix density is utilized. Accordingly, $n^2$ matrix elements must be provided in such prior art arrangements. To provide for optical cross-connect functionality requires that a 1×n DWDM de-multiplexer 202 be utilized to de-multiplex n wavelength components from the multiplexed input 201 for coupling to switch matrix 210. A 1×n DWDM de-multiplexer 208 is also necessary to de-multiplex the multiplexed add wavelength components from add input 207 for coupling to switch matrix 210 for the add wavelength input 207. An n×1 DWDM multiplexer 206 is used to multiplex the switched wavelength components from switch matrix 210 to multiplexed output 203. Another n×1 multiplexer 204 is used to multiplex together switched wavelength components from switched matrix 210 to drop output 205. Each switch matrix element 220 of switch 210 may be in either one or the other of two switched states. As shown in FIG. 2, switch element 211 and switch element 213, are activated to drop wavelength components $\lambda 1, \lambda n$ and output the dropped wavelength components to drop output 203. In addition wavelengths $\lambda 1, \lambda n$ received at input 207 are added and outputted at through output 205. All the remaining matrix elements pass wavelength components directly from input de-multiplexer 202 to output de-multiplexer 204. Switch element 211 blocks $\lambda 1$ from passing from input de-multiplexer 201 to output multiplexer 204, allowing add wavelength component $\lambda 1$ to traverse path 216 from add de-multiplexer 208 to through multiplexer 204, while rerouting $\lambda 1$ from input de-multiplexer 202 to drop multiplexer 206 via path 218. Similarly, matrix element 213 allows $\lambda n$ from input de-multiplexer 202 to be routed to drop multiplexer 206 via path 222.

Although the example shown drops and adds two wavelengths, it will be understood by those skilled in the art, that any number of wavelengths up to number n may be dropped and added.

As described above, optical switch matrices such as switch 200 are complex and extremely expensive. They typically have high insertion loss, typically over 10 dB for 64 wavelength components and are relatively slow in switching, i.e. 10 ms. In addition, it is difficult to increase the scale of the switch. By way of example, increasing the number of wavelength components requires an exponential increase in the number of switch matrix elements. By way of example, increasing the number of wavelength components to 256 requires 64,000 switching elements.

The present invention overcomes the shortcomings of the prior arrangements by utilizing a newly developed interferometer wavelength router technology. With this technology, only one interferometer having n phase modulators or phase shifters are used to achieve the functionality of an n wavelength optical cross-connect. The use of interferometer wavelength router technology leads to very specific advantages. Namely, a very low cost optical cross-connect can be provided that has low insertion loss, on the order of 1–2 dB. The switching speed obtainable is significantly faster, in the microsecond range. The optical router or cross-connect is easy to scale up in size. In addition, an optical cross-connect in accordance with the principles of the invention is highly reliable because it has no moving parts. An optical cross-connect in accordance with the invention is an all optical fiber device.

FIG. 3 illustrates a prior art Sagnac type interferometer 300. Interferometer 300 includes a 2×2 optical coupler 301 that includes optical ports 302, 304, 306, 308. Ports 306, 308 are coupled to a fiber loop 303 to form the well-known configuration of a Sagnac interferometer. Input signals at either port 302 or port 304 produce equal intensity counter-propagating beams in loop 303. The counter-propagating beams interfere at coupler 301. Sagnac interferometer principles are well known, and for purposes of succinctness, a description of the operation of the Sagnac interferometer is not presented in this patent.

Figure 4:
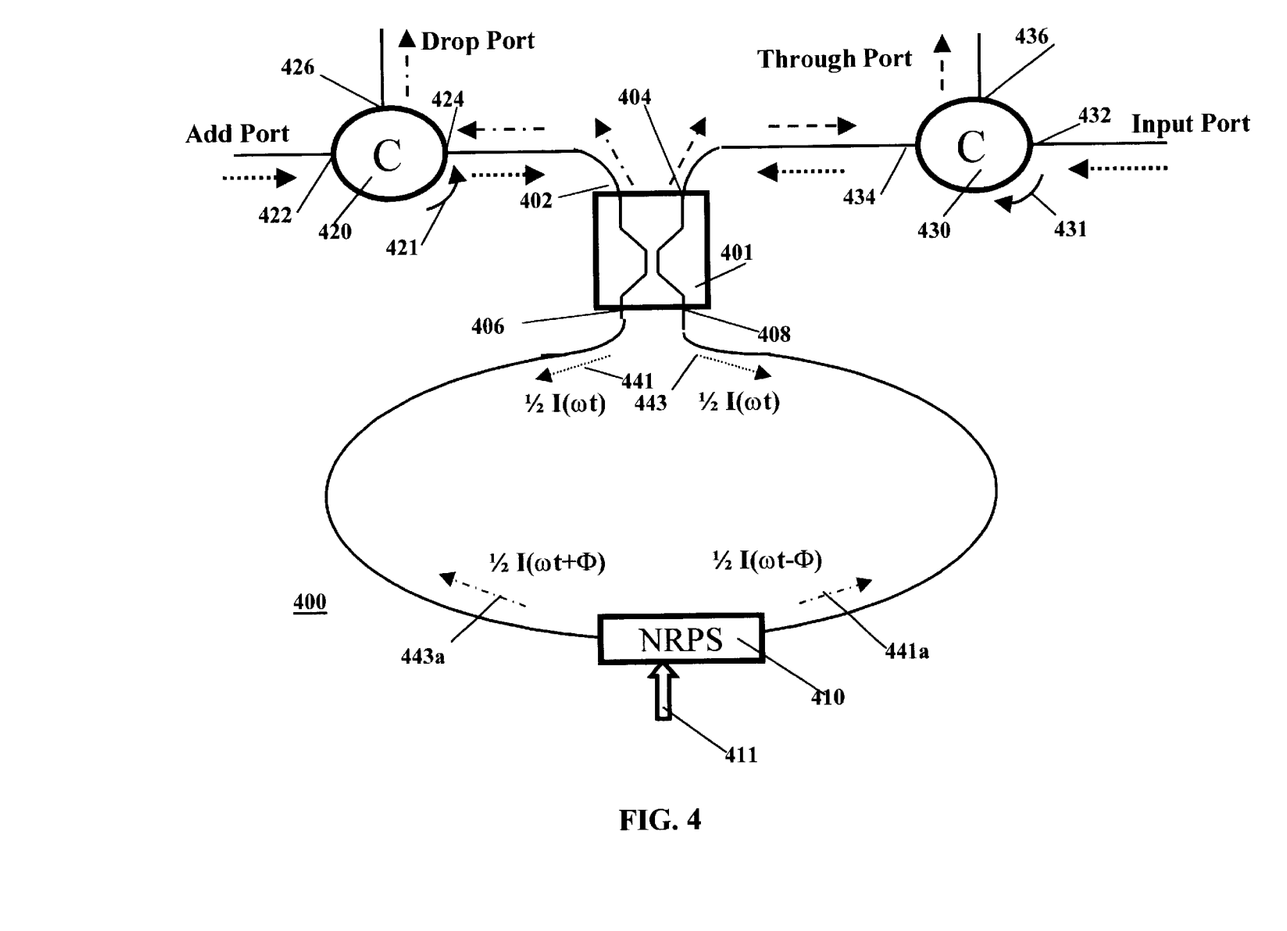
FIG. 4 is a diagram of a Sagnac interferometer wavelength router or optical cross-connect in accordance with the principles of the invention.

FIG. 4 illustrates an interferometer wavelength router 400 that is based upon a Sagnac interferometer such as that shown in FIG. 3. The Sagnac interferometer configuration is provided by coupler 401 having ports 402, 404, 406, 408. An optical fiber loop 403 is provided between ports 406, 408. A phase modulator 410 is inserted into the Sagnac loop 403. A circulator 420 having ports 422, 424, 426 and a circulator 420 having ports 432, 434, 436 are each coupled to coupler 401. Circulators 420, 430 have circulation directions indicated by arrows 421, 431, respectively. Circulator 420 has port 424 coupled to port 402 of coupler 401. Circulator 430 has port 434 coupled to coupler 401 port 404. Circulator port 430 port 432 functions as an input port and port 436 functions as a through port. Ports 432, 436 function as add and drop ports, respectively. Phase modulator 410 has a control input 411 that is utilized to control the operation of phase modulator 410. More specifically, by controlling the phase shift in Sagnac loop 403, optical signals may be switched or routed. In the illustrative embodiment shown in FIG. 4, phase modulator 410 is a non-reciprocal phase shifter. A non-reciprocal phase shifter provides a first phase shift in optical signals flowing in one direction and a different phase shift in optical signals flowing in the opposite direction through the phase shifter.

The Sagnac loop configuration is such that input signals $I(\omega t)$ at either port 402 or port 404 produce corresponding counter-propagating beams ½ $I(\omega t)$, represented by arrows 441, 443, that propagate from coupler 401 through fiber loop 403. Non-reciprocal phase shifter 410 provides a non-reciprocal phase shift to the counter propagating beams. In the phase shifter 410 utilized in the illustrative embodiment, an equal magnitude of phase shift $\Phi$ is provided to signals in both directions, but the phase shifts are of opposite sign to produce signals ½ $I(\omega t+\Phi)$, and ½ $I(\omega t-\Phi)$. When the phase shift $\Phi$ of non-reciprocal phase shifter 410 is set to 0°, or the non-reciprocal phase shifter 410 is turned off, $\Phi=0°$, and the phase difference between the two counter-propagating beams after passing through non-reciprocal phase shifter 410 as represented by arrows 441a, 443a is 0°. In other words, the two beams are in phase. When the two beams recombine at coupler 201 the beams interfere and produce switching such that the optical signals at input port 432 are coupled to through port 436, and the optical signals at add port 422 are coupled to drop port 426.

When the phase shift $\Phi$ of non-reciprocal phase shifter 410 is set to 90°, the phase between counter propagating beams 441a, 443a becomes 180°. In other words, the counter-propagating beams are completely out of phase. When the two counter-propagating, phase shifted beams recombine at coupler 401 the two beams interfere and produce an optical cross-connect such that the optical signals that were at input port 432 are coupled to drop port 426 and optical signals at add port 422 are coupled to through port 436. Control bus 411 is utilized to provide control signals to determine the phase shift $\Phi$ provided by non-reciprocal phase shifter 410. The structure shown in FIG. 4 will switch/route all wavelengths.

Figure 5:
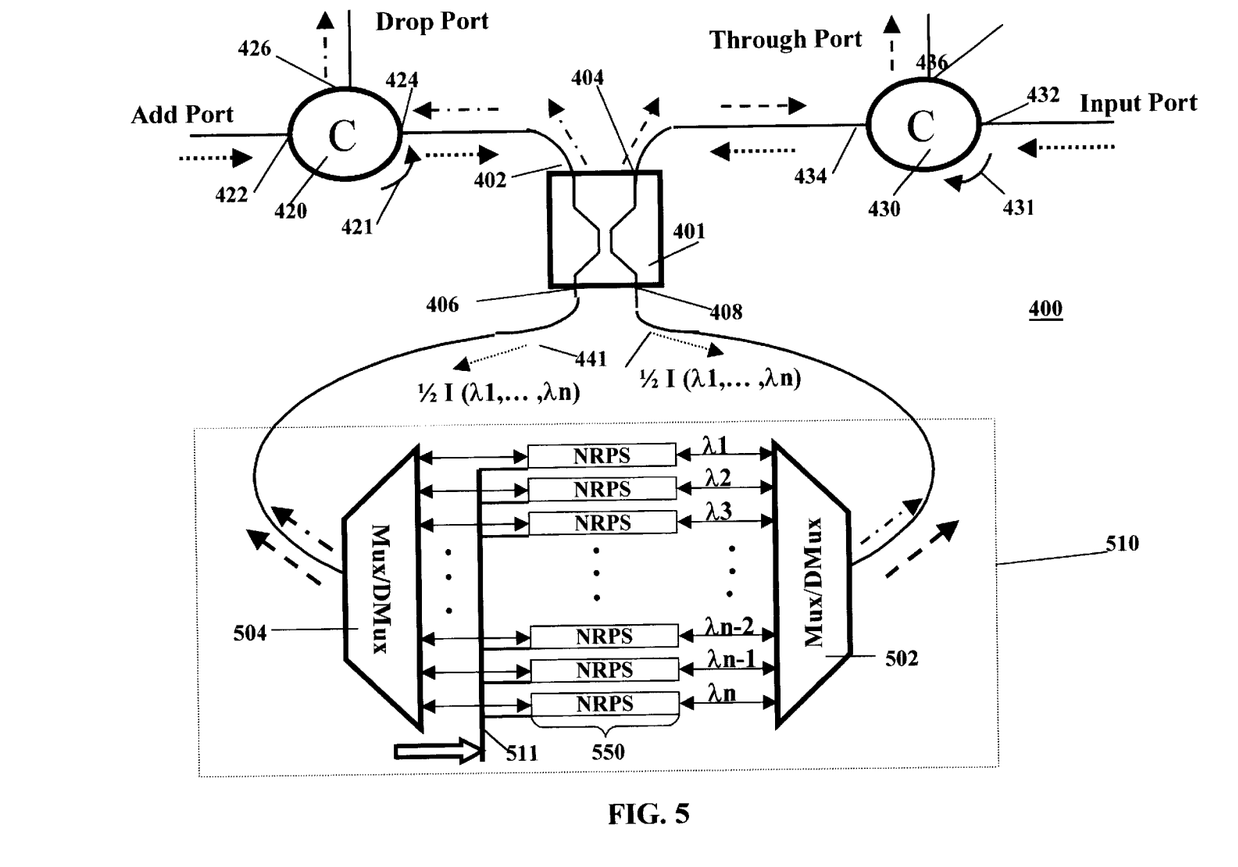
FIG. 5 illustrates the Sagnac interferometer wavelength router of FIG. 4 in greater detail.

Turning now to FIG. 5, a Sagnac interferometer wavelength router 400 is shown in more detail to show how a multiple wavelength selective phase shifter is used to separately selectively switch/route a plurality or multiple wavelengths. The structure 400 is identical to that shown in FIG. 4 except that a multiple wavelength non-reciprocal phase shifter 510 is utilized to selectively switch/route individual wavelength components of wavelength multiplexed signals. Multiple wavelength non-reciprocal phase shifter 510 includes multiplexer/de-multiplexer 502 and multiplexer/de-multiplexer 504 and a plurality of non-reciprocal phase shifters 550. The number of non-reciprocal phase shifters 550 corresponds in number to the number, n, of wavelength components in the multiplexed wavelength component signals at input port 432 and output port 434. Each non-reciprocal phase shifter 550 is coupled between the corresponding wavelength input/output of multiplexer/de-multiplexer 502 and multiplexer/de-multiplexer 504. Control bus 511 is utilized to control the operation of each of phase shifters 550 so that the phase shift of each non-reciprocal phase shifter 550 may be controlled independently of all other non-reciprocal phase shifters 550.

Figure 6:
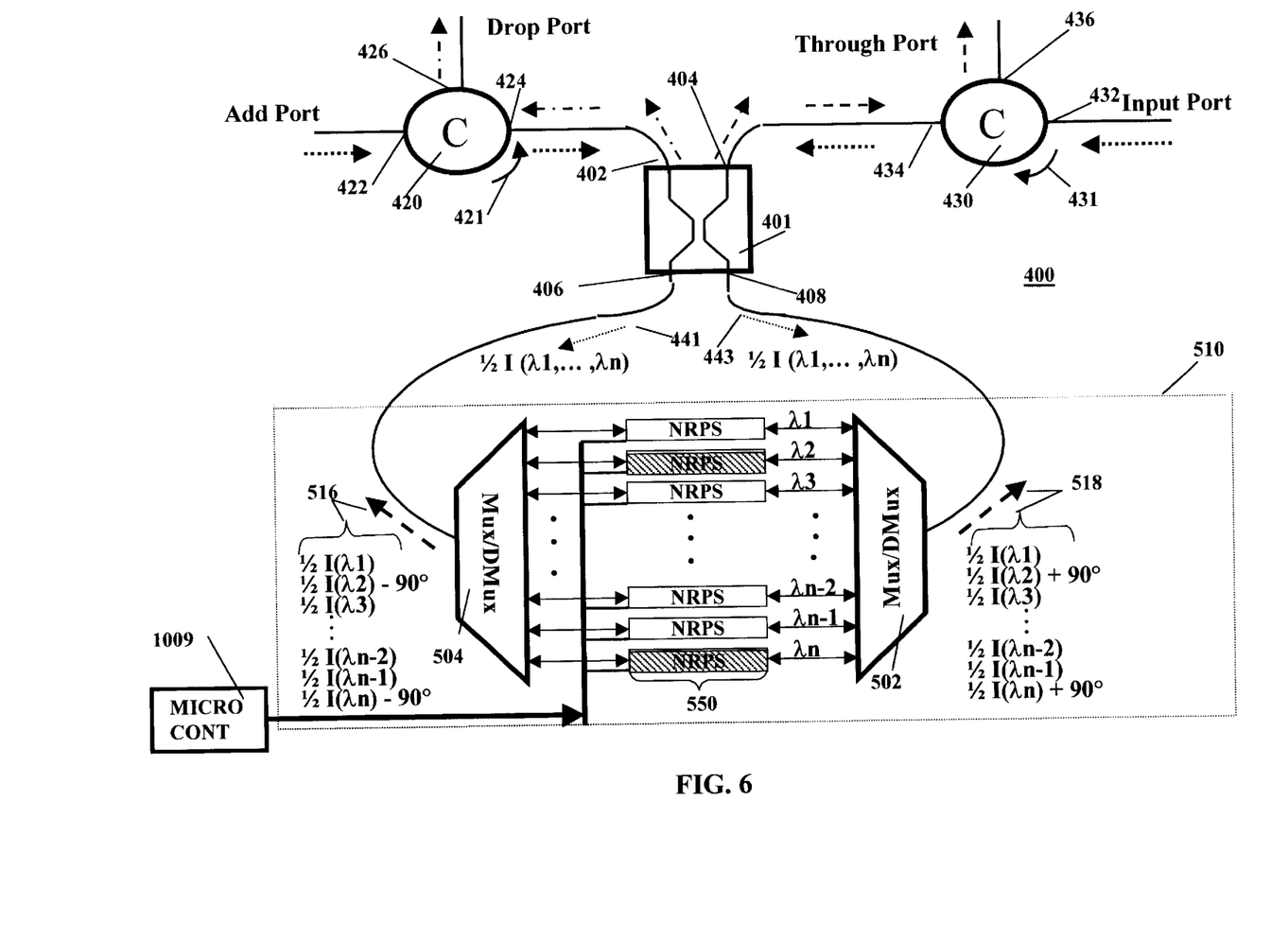
FIG. 6 illustrates the add/drop of two wavelengths in the router of FIG. 5.

FIG. 6 illustrates the operation of the optical cross-connect or router 500 of FIG. 5 for the case where two wavelength components $\lambda_2$, $\lambda n$ are added from add port 422 to input wavelength components $\lambda 1$, $\lambda 2$, . . . ,$\lambda n-1$, $\lambda n$ received at input port 432. Wavelength components $\lambda_2$, $\lambda n$ received at port 432 are dropped to drop port 426. Electrical control signals from a micro controller 1009 are used to individually control the phase shift of non-reciprocal phase shifters 550. In the illustrative embodiment shown, the magnitude of the phase shift produced by each non-reciprocal phase shifter 550 will be the same for light traveling in a clockwise direction or counter clockwise direction through loop 403, but the phase shifts will be of opposite sign. The normal or quiescent state for each non-reciprocal phase shifter 550 is to provide a zero phase shift. Input light signals at coupler 401 are split into two counter-propagating light beams. If the non-reciprocal phase shifter 550 for a particular wavelength component does not provide a phase shift, the counter-propagating light beams will be in phase when they reach coupler 401 and will interfere. The result is that the wavelength component is reflected back to the same port 402, 404 at which it was supplied to coupler 401. If the non-reciprocal phase shifter 550 for a wavelength component is set to provide a phase shift of 90°, the clockwise propagating portion of the wavelength component is phase shifted by −90°, and the counter-clockwise propagating portion is phase shifted by +90°. When the counter-propagating wavelength component portions recombine at coupler 401, they do not interfere and reflect back to the originating port 402 or 404, but instead interfere and combine and propagate to the other port 404, or 402, respectively. In the example shown, non-reciprocal phase shifters 550 for wavelengths $\lambda 2$, and $\lambda n$ are set to provide a 90° phase shift, all other non-reciprocal phase shifters are set to provide a 0° phase shift. Optical wavelength signals $\lambda 1$, $\lambda 2$, . . . ,$\lambda n-1$, $\lambda n$ at port 432 are applied to port 404 of coupler 401 and each wavelength component is split into two equal counter-propagating beams 441, 443 in loop 403. For wavelength components $\lambda 2$ and $\lambda n$, the corresponding non-reciprocal phase shifters operate so that the wavelength components are switched to port 402. From port 402, wavelength components $\lambda 2$, $\lambda n$ are coupled by circulator 420 to drop port 426. Similarly, add wavelength components $\lambda 2$, $\lambda n$ at add port 422 are split into counter-propagating beams 406, 408 on loop 403 by coupler 401. The same corresponding non-reciprocal phase shifters 550 assigned to the wavelength switch the add wavelength components $\lambda 2$, $\lambda n$ to port 402 of coupler 401. The add wavelength components are coupled to port 434 of circulator 430. Circulator 430 couples the add wavelength components to port 436. All remaining wavelength components at input port 432, are reflected back by coupler 401 and circulate to port 434 of circulator 430. The phase shifts for each of wavelength components $\lambda 1$, $\lambda 2$, . . . ,$\lambda n-1$, $\lambda n$ after passing through non-reciprocal phase shifters 550 for each direction after passing through the non-reciprocal phase shifters is shown in conjunction with arrows 516, 518. For wavelength $\lambda_2, \lambda_n$, the difference is 180°, i.e., these two wavelength components in light beams 526, 518 are out of phase. When counter propagating portions of wavelength components $\lambda_2, \lambda_2$ recombine at coupler 401 the counter-propagating portions of the wavelength components will interfere and produce cross-connect. The result is that the two wavelength components $\lambda 2, \lambda n$ at input port 432 are automatically transferred to drop port 426 and the two wavelength components $\lambda 2, \lambda n$ at add port 422 are coupled to through port 436. For all other wavelength components, the difference is 0° and those components at input port 432 appear at through port 436.

Although the foregoing example utilizes two wavelength components to be added, any number of wavelength components may be added and dropped.

Figures 7, 8:
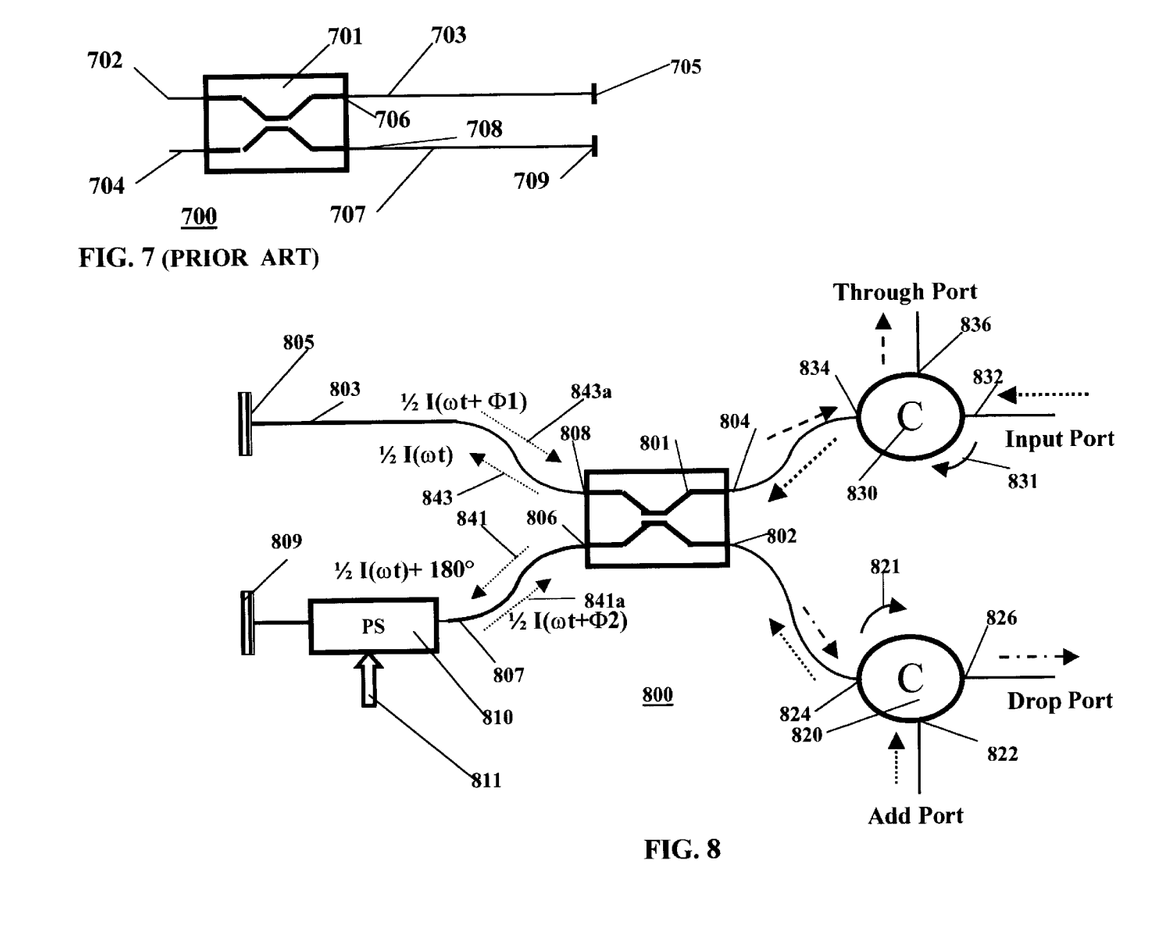
FIG. 7 shows a Michelson interferometer structure.
FIG. 8 is a diagram of a Michelson interferometer wavelength router or optical cross-connect in accordance with the principles of the invention.

Turning now to FIG. 7, a prior art Michelson Interferometer 700 is shown. In Michelson interferometer 700, a 2×2 coupler 701 has ports 702, 704, 706, 708. Ports 702, 704 are used as input/output ports. Port 706 has an optical fiber arm 703 coupled to it and port 708 is coupled to optical fiber arm 707. Arm 703 terminates in a reflector 705. Arm 707 terminates in a reflector 709. The operation Michelson interferometers are known and a description of the operation of such an interferometer is not provided herein.

FIG. 8 illustrates an interferometer wavelength router 800 that is based upon a Michelson interferometer such as that shown in FIG. 7. A phase modulator is utilized in a Michelson interferometer configuration. The phase modulator 810 is implemented as a phase shifter 810 coupled into one arm 807 of the interferometer. It should be apparent to those skilled in the art that although only on arm 807 of the structure of FIG. 8 includes a phase modulator or phase shifter, a phase modulator or phase shifter may be also disposed in the other arm 803. In such a structure, one of the pair of phase modulators could be a non-reciprocal phase shifter and the other could be a reciprocal phase shifter. Each arm 803, 807 terminates in a reflective surface or mirror 805, 809, respectively. Reciprocal phase shifter 811 creates a phase shift Φ that is the same regardless of the direction of the light. The phase shifter, or in the case where a pair of phase shifters are utilized, provide switching and routing.

Input optical signals at ports 802, 804 are switched or routed in much the same way that optical signals are switched or routed in the Sagnac interferometer structures described above. Coupler 801 has ports 802, 804, 806, 808. A circulator 820 having ports 822, 824, 826 and a circulator 830 having ports 832, 834, 836 are coupled to coupler 801. Circulators 820, 830 have circulation directions indicated by arrows 821, 831, respectively. Circulator 820 has port 824 coupled to port 802 of coupler 801. Circulator 830 has port 834 coupled to coupler 801 port 804. Circulator port 830 port 832 functions as an input port and port 836 functions as a through port. Ports 832, 836 function as add and drop ports, respectively. Phase modulator 810 has a control input 811 that is utilized to control the operation of phase modulator 810. More specifically, by controlling the phase shift in arm 807, optical signals may be switched or routed. In the illustrative embodiment shown in FIG. 8, phase modulator 810 is a reciprocal phase shifter. A reciprocal phase shifter provides the same amount of phase shift in optical signals flowing in either direction.

The Michelson interferometer configuration is such that a light beam at input port 804 is coupled by coupler 801 as two equal intensity light beams ½ I(ωt) to both arms 807, 803, respectively. The light beam 843 in arm 803 is reflected by reflector 805 to produce return beam 843a that is shifted by some amount Φ1. In the specific example shown, Φ1=0°. Light beam 841 passes through phase shifter 810 and is shifted by a phase amount Φ. The shifted beam is reflected by reflector 809 and passes back through phase shifter 810 in the opposite direction. The reflected beam is again shifted by a phase amount Φ. Thus the total amount of phase shift in the return signal 841a is 2×Φ=Φ2. By using control signals on bus 811, the phase shift Φ is selected as either 0° or 90°.

By selecting the phase shift Φ to be 0°, the beam portions 843a and 841a are completely in phase. When recombined at coupler 801 these two beams will interfere and cause optical signals at a port 802, 804 to reflect back to that same port. By selecting the phase shift to be 90°, the total amount of phase shift Φ2=180°. With a 180° phase shift in the beam 841a, and no phase shift in beam 843a, the two beams when combined at coupler 801 interfere and produce a cross-connect of ports 802 and 804. In other words, when the two beams recombine at coupler 801 the beams interfere and produce switching such that the optical signals at input port 832 are coupled to through port 826, and the optical signals at add port 822 are coupled to drop port 836.

Figure 9:
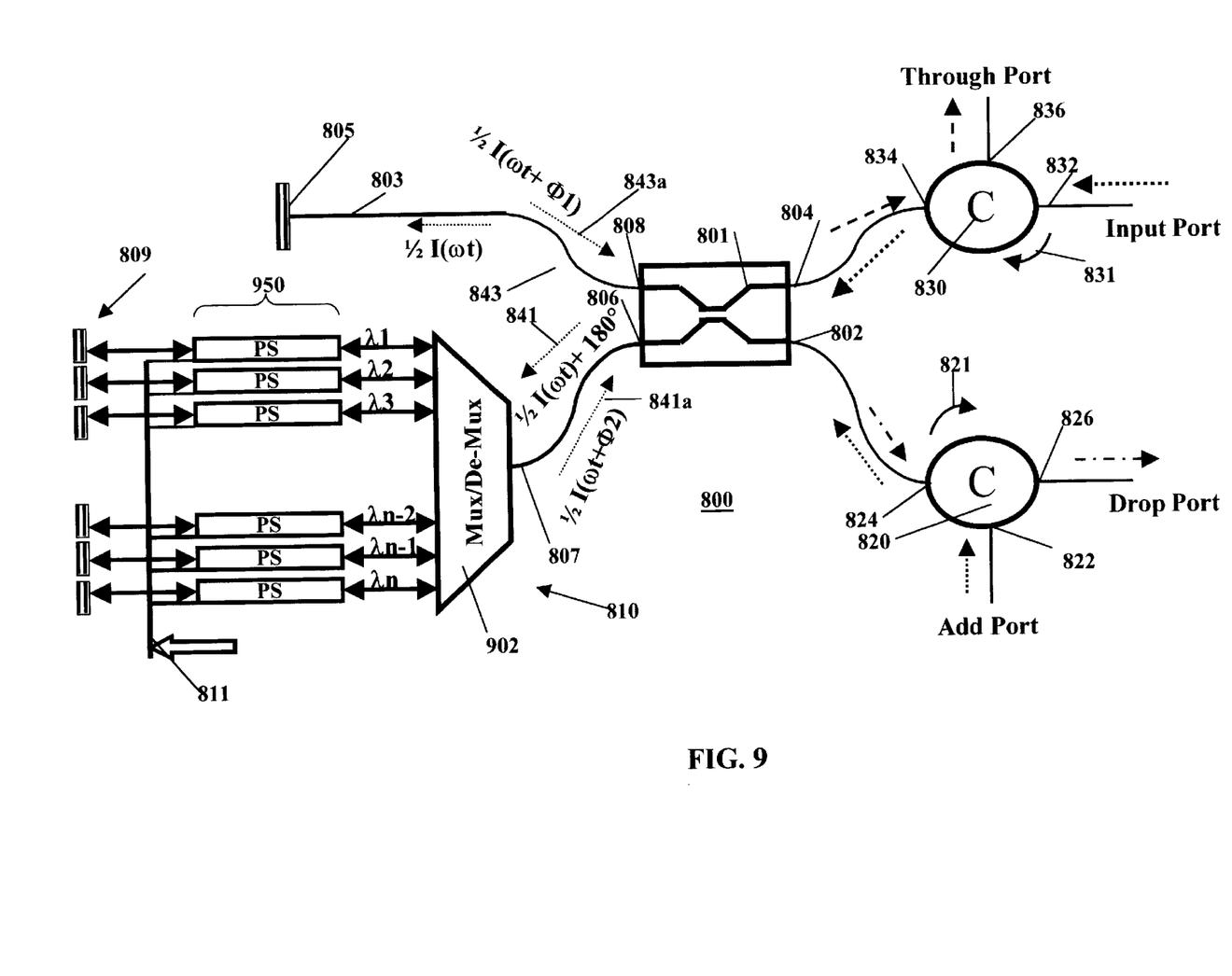
FIG. 9 illustrates the Michelson interferometer wavelength router or optical cross-connect of FIG. 8 in greater detail.

Turning now to FIG. 9, a Michelson interferometer wavelength router 900 that separately switches/routes a plurality or multiple of wavelengths is shown. The structure is identical to that shown in FIG. 8 except that a multiple wavelength phase shifter 810 is utilized to selectively switch/route individual wavelength components of wavelength multiplexed signals. Multiple wavelength phase shifter 810 includes multiplexer/demultiplexer 902, a plurality of non-reciprocal phase shifters 950, and a plurality of reflectors 809. The number of non-reciprocal phase shifters 850 and the number of reflectors 809 each corresponds in number to the number, n, of wavelength components in the multiplexed wavelength component signals at input port 832 and output port 834. Each phase shifter 950 is coupled between the corresponding wavelength input/output of multiplexer/de-multiplexer 902 and a corresponding one of reflectors 809. Control bus 811 is utilized to control the operation of each of phase shifters 950 so that the phase shift of each phase shifter 950 may be controlled independently of all other phase shifters 950.

Figure 10:
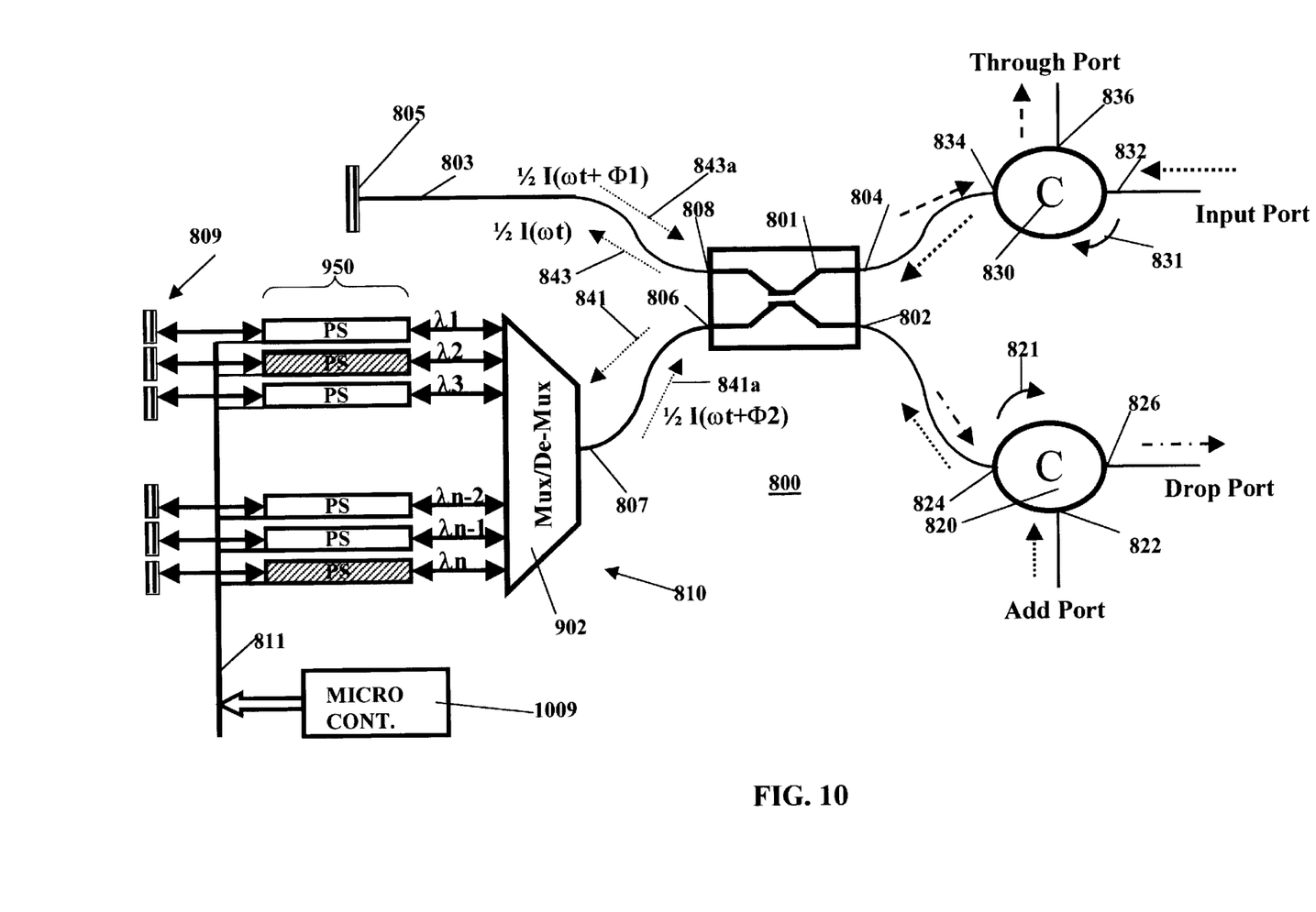
FIG. 10 illustrates add/drop of two wavelengths in the structure of FIG. 9.

FIG. 10 illustrates the operation of the optical cross-connect or router 800 of FIG. 8 for the case where two wavelength components $\lambda_2, \lambda n$ are added from add port 822 to input wavelength components $\lambda 1, \lambda 2, \ldots, \lambda n-1, \lambda n$ received at input port 832. Wavelength components $\lambda_2, \lambda n$ received at port 832 are dropped to drop port 826. Electrical control signals from a micro controller 1009 are used to individually control the phase shift of phase shifters 950. The normal or quiescent state for each non-reciprocal phase shifter 950 is to provide a zero phase shift. Input light signals at coupler 801 are split into two light beams. If phase shifter 950 for a particular wavelength component does not provide a phase shift, the reflected light beams will be in phase when they reach coupler 801 and will interfere. The result is that the wavelength component is reflected back to the same port 802, 804 at which it was supplied to coupler 801. If phase shifter 950 for a wavelength component is set to provide a phase shift of 90°, the reflected portion 841a of the wavelength component in that arm is phase shifted by 180°. When two reflected wavelength component portions 841a, 843a recombine at coupler 801, they interfere to produce a cross-connect and propagate to the other port 804, or 802, respectively. In the example shown, phase shifters 850-2, 850-n for wavelengths λ2, and λn are set to provide a 90° phase shift, all other phase shifters are set to provide a 0° phase shift. Optical wavelength signals λ1, λ2, . . . ,λn−1, λn at port 832 are applied to port 804 of coupler 801 and each wavelength component is split into two equal counter-propagating beams in loop 803. For wavelength components λ2 and λn, the corresponding phase shifters 850-2, 850-n operate so that the wavelength components are switched to port 802. From port 802, wavelength components λ2, λn are coupled by circulator 820 to drop port 826. Similarly, add wavelength components λ2, λn at add port 822 are split into beams 906, 908 on arms 803, 807 by coupler 801. The same corresponding phase shifters 950 assigned to the wavelength switch the add wavelength components λ2, λn to port 802 of coupler 801. The add wavelength components are coupled to port 834 of circulator 830. Circulator 830 couples the add wavelength components to port 836. All remaining wavelength components at input port 832, are reflected back by coupler 801 and circulate to port 834 of circulator 830. When reflected portions of wavelength components $\lambda_2$, $\lambda_n$ recombine at coupler 801 the 180° phase shifted portions of the wavelength components will interfere with the unshifted portions and produce cross-connect. The result is that the two wavelength components λ2, λn at input port 832 are automatically transferred to drop port 826 and the two wavelength components λ2, λn at add port 822 are coupled to through port 836. For all other wavelength components, the difference is 0° and those components at input port 832 appear at through port 836.

Although the foregoing example utilizes two wavelength components to be added, any number of wavelength components may be added and dropped.

Figure 11:
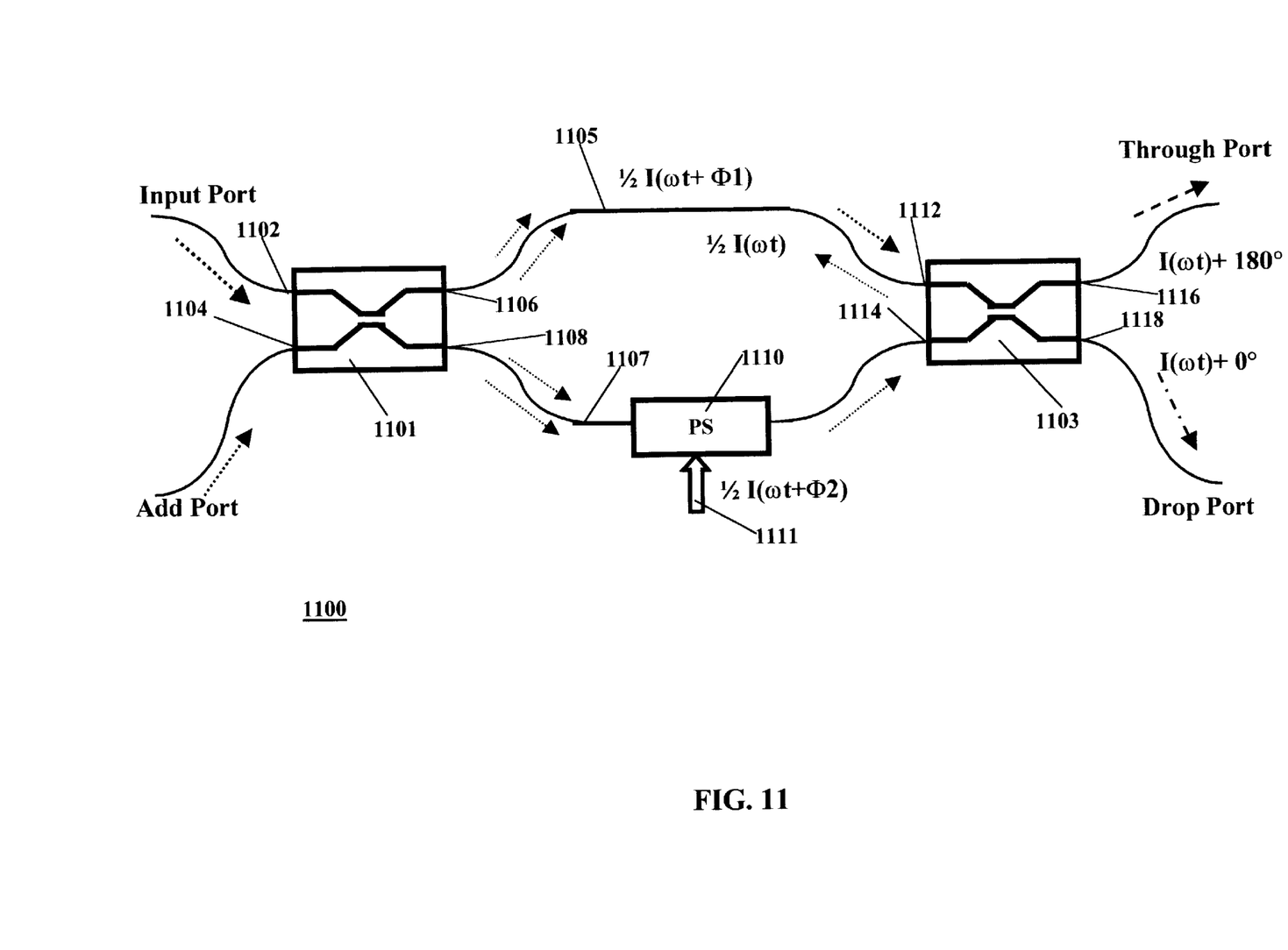
FIG. 11 is a diagram of a Mach-Zehnder interferometer wavelength router or optical cross-connect in accordance with the principles of the invention.

FIG. 11 illustrates a Mach-Zehnder interferometer 1100 with phase modulator 1110 in accordance with the invention. A reciprocal phase shifter IS utilized as phase modulator 1110 to provide switching and routing. The Mach-Zehnder configuration utilizes two 2×2 couplers 1101, 1103. Coupler 1101 has four ports 1102, 1104, 1106, 1108 and coupler 1103 has four ports 1112, 1114, 1116, 1118. A first waveguide arm 1105 couples port 1106 to port 1112 and a second waveguide arm 1107 couples port 1108 to port 1114. Phase shifter 1110 is disposed in one arm 1107. Phase shifter 1110 provides switching and routing. Phase shifter 1110 is switchable so as to provide a phase shift of either 0° or 180°. When the phase difference between the beams propagating on arms 1105, 1107 is 0°, the beam portions interfere when recombined at coupler 1103 and produce switching such that the input port 1102 is coupled to through port 1116 and add port 1104 is coupled to drop port 1118. When the phase difference between the beams propagating on arms 1105, 1107 is 180°, the beam portions interfere when recombined at coupler 1103 and produce a cross-connect such that signals at input port 1102 are coupled to drop port 1118 and signals at add port 1104 are coupled to through port 1116.

Figure 12:
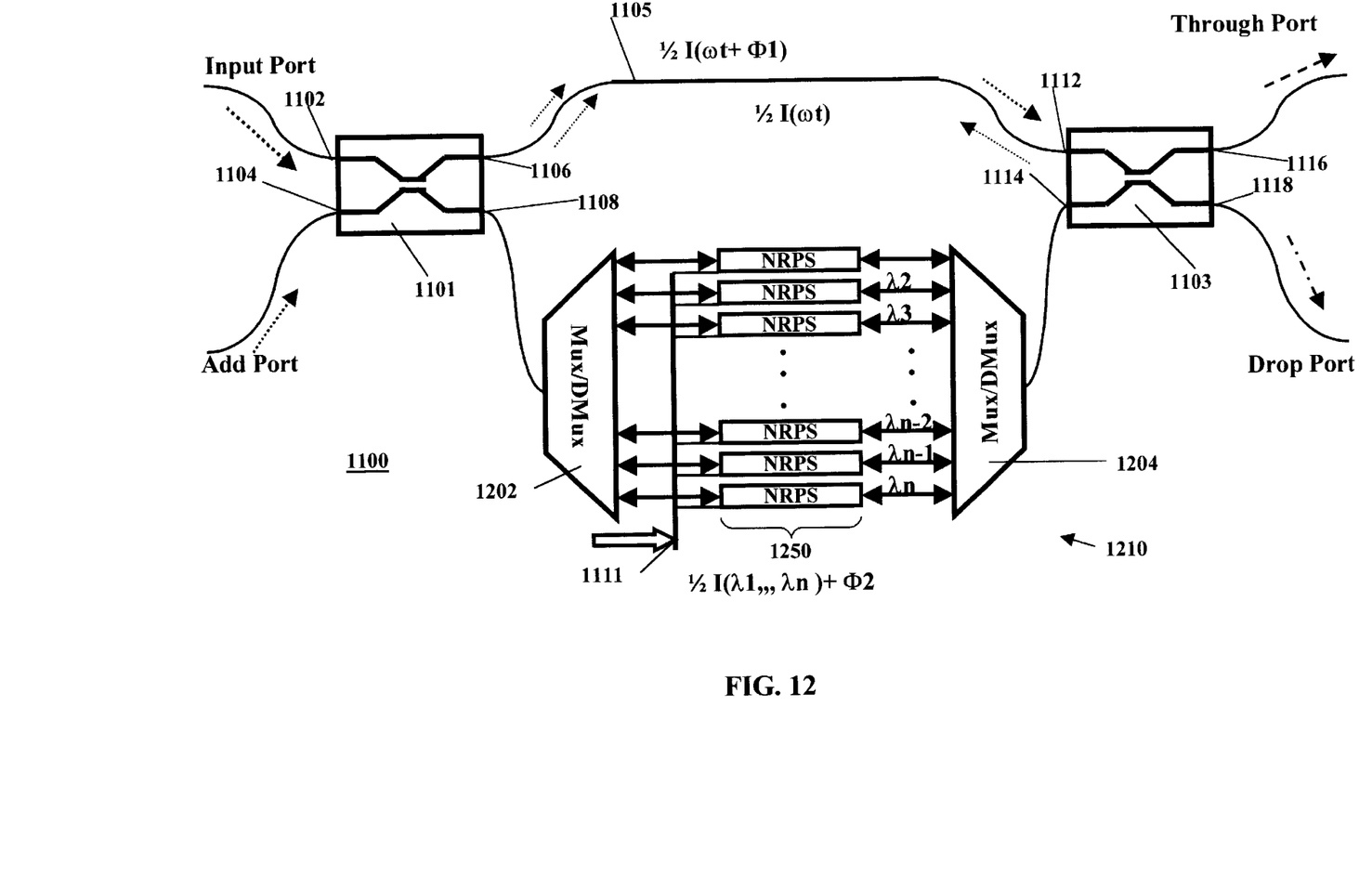
FIG. 12 illustrates the Mach-Zehnder interferometer router or optical cross-connect of FIG. 11 in greater detail.

Turning now to FIG. 12, a Mach-Zehnder interferometer wavelength router 1100 that separately switches/routes a plurality or multiple of wavelengths is shown. The structure is identical to that shown in FIG. 11 except that a multiple wavelength phase shifter 1210 is utilized to selectively switch/route individual wavelength components of wavelength multiplexed signals. Multiple wavelength phase shifter 1210 includes multiplexer/de-multiplexer 1202, a plurality of phase shifters 1250, and a second multiplexer/de-multiplexer 1204. The number of non-reciprocal phase shifters 1250 corresponds in number to the number, n, of wavelength components in the multiplexed wavelength component signals at input port 1102 and output through port 1116. Each phase shifter 1250 is coupled between the corresponding wavelength input/outputs of multiplexer/de-multiplexers 1204, 1204. Control bus 1111 is utilized to control the operation of each of phase shifters 1250 so that the phase shift of each phase shifter 1250 may be controlled independently of all other phase shifters 1250.

Figure 13:
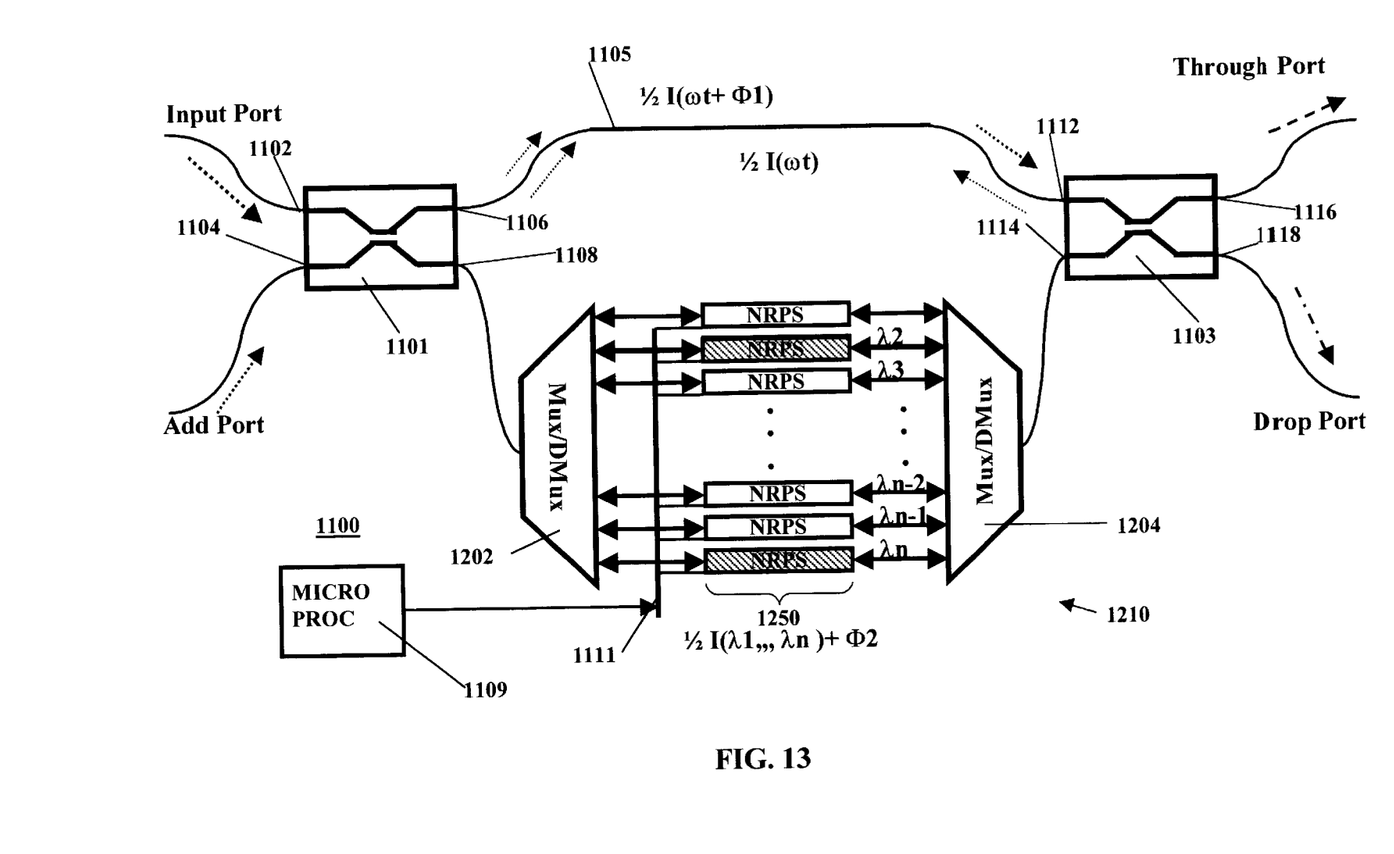
FIG. 13 illustrates add/drop of two wavelengths in the structure of FIG. 12.

FIG. 13 illustrates the operation of the optical cross-connect or router 1100 of FIG. 11 for the case where two wavelength components $\lambda_2$, λn are added from add port 1104 to input wavelength components λ1, λ2, . . . ,λn−1, λn received at input port 1102. Wavelength components $\lambda_2$, λn received at port 1102 are dropped to drop port 1118. Electrical control signals from a micro controller 1109 are used to individually control the phase shift of phase shifters 1250. The normal or quiescent state for each phase shifter 1250 is to provide a zero phase shift. Input light signals at coupler 1101 are split into two light beams. If phase shifter 1250 for a particular wavelength component does not provide a phase shift, relative to the wavelength component portion propagating in arm 1105, the light beams portions propagating in arms 1105 and 1107 will be in phase when they reach coupler 1103. The result is that the wavelength component from input port 1102 is coupled to through port 1116 and the wavelength component at add port 1101 is coupled to drop port 1118. If phase shifter 1250 for a wavelength component is set to provide a phase shift of 180°, the portion of the wavelength component in arm 1107 is phase shifted by 180° relative to the portion of the wavelength component in arm 1105. When the two wavelength component portions recombine at coupler 1103, they interfere to produce a cross-connect such that the wavelength component from input port 1102 is coupled to drop port 1118 and the wavelength component at add port 1104 is coupled to through port 1116. In the example shown, phase shifters 1250 for wavelengths λ2, and λn are set to provide a 180° phase shift, all other phase shifters 1250 are set to provide a 0° phase shift. Optical wavelength signals λ1, λ2, . . . ,λn−1, λn at port 1102 of coupler 801 are each split into two equal portions, one propagating on each arm 1105, 1107. For wavelength components λ2 and λn, the corresponding phase shifters 1250 operate so that the wavelength components from input port 1102 are switched to drop port 1118. All other wavelength components at input port 1102 are coupled to through port 1116. Similarly add wavelength components λ2, λn at add port 1104 are split into beams on arms 1105, 1107 by coupler 1101. The same corresponding phase shifters 1250 assigned to the wavelength switch the add wavelength components λ2, λn to port 1116. Although the foregoing example utilizes two wavelength components to be added, any number of wavelength components may be added and dropped.

Reciprocal phase shifter types are known in the prior art and include both waveguide type phase modulators, such as LiNbO$_3$, including electro-optic phase modulators and thermal optic modulators, and fiber type phase shifters, including pzt based fiber stretcher type phase shifters.

Figure 14:
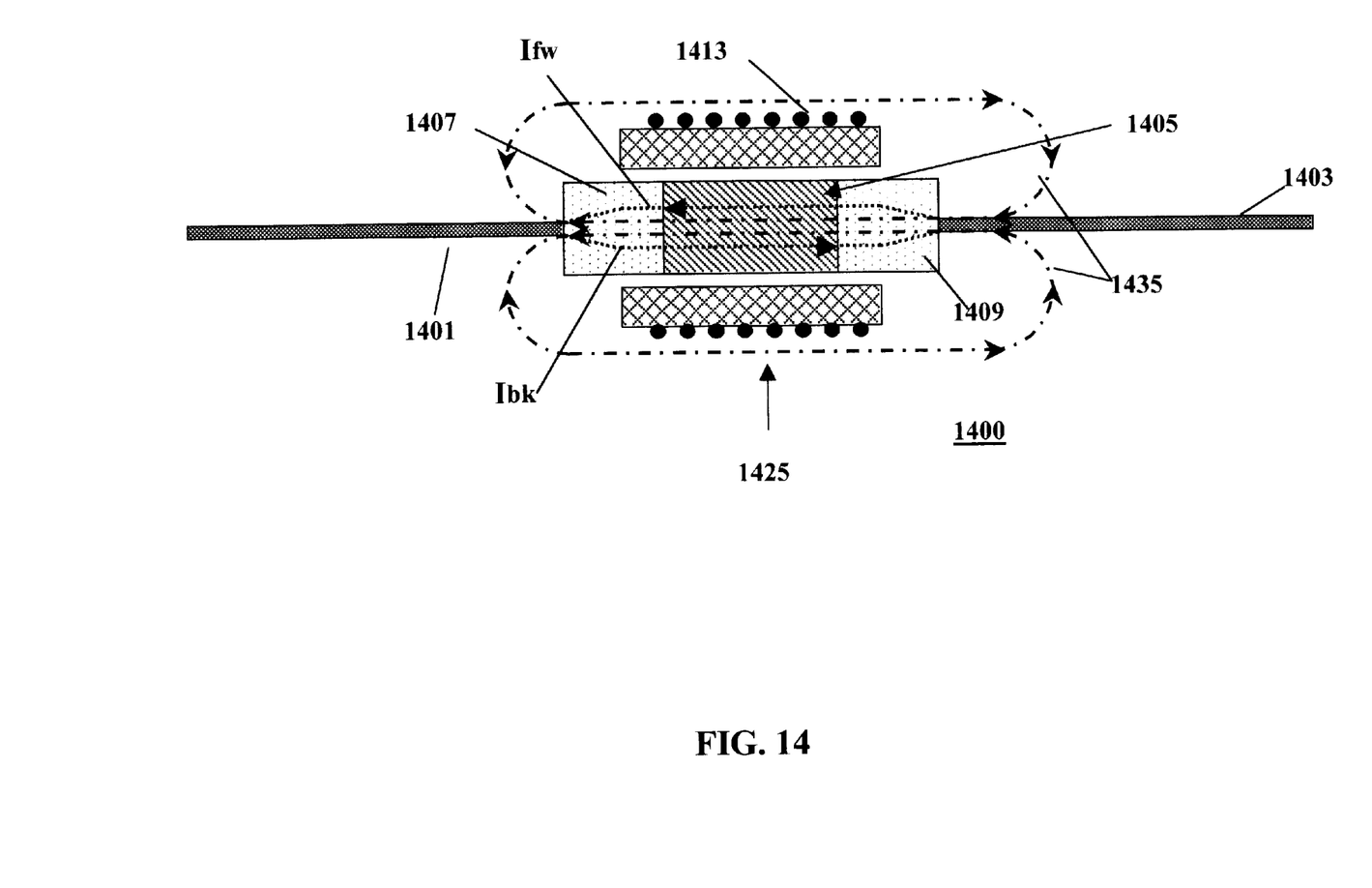
FIG. 14 illustrates a non-reciprocal phase shifter that may be advantageously utilized in the invention.

One particularly advantageous non-reciprocal phase shifter 1400 that is useable in the structures of the invention is shown in FIG. 14. Optical signals are coupled to and from the non-reciprocal phase shifter 1400 via optical waveguides 1401, 1403, which in the particular embodiment shown are optical fiber. However, in other embodiments, one or both of the waveguides 1401, 1403 may be waveguides formed on a substrate and the non-reciprocal phase shifter may be formed on the substrate also as an integrated optic device. Non-reciprocal phase shifter 1400 comprises a Faraday rotator crystal 1405 which may be a crystal or thin-film device. A graded index lens 1407 is attached to the end of optical fiber 1401 and is attached to Faraday rotator crystal 1405. A second graded index lens 1409 is coupled to optical fiber 1403 and to Faraday rotator crystal 1405. Lenses 1407, 1409 are bonded to optical fibers 1401, 1403, respectively and to Faraday rotator crystal 1405 with epoxy cement. Graded index lenses 1401, 1403 are each of a type known in the trade as Sel-Foc lenses.

Faraday rotator crystal 1405 may be any magneto-optic material that demonstrates Faraday rotation such as Yttrium Iron Garnet or Bismuth Iron Garnet.

An electromagnet 1425 disposed proximate Faraday rotator crystal 1405 includes a coil assembly 1413. Electromagnet 1425 provides a magnetic field indicated by field lines 1435 when current flows through coil 1413. Non-reciprocal phase shifter 1400 operates with optical waves of a single polarization. The polarization, i.e., TE or TM, is determined by the selected crystal orientation. Optical signals in one direction through non-reciprocal phase shifter 1400 are designated as forward beam signals Ifw, and optical signals in the opposite direction are designated as backward beam signals Ibk. For forward beam signals Ifw, non-reciprocal phase shifter 1400 provides a phase shift of $\omega t+\Phi$. For backward beam signals Ibw, non-reciprocal phase shifter 1400 provides a reciprocal phase shift of $\omega t-\Phi$.

In the above description reference is made to various directions signal propagation directions. It will be understood that the directional orientations are with reference to the particular drawing layout and are not intended to be limiting or restrictive.

As will be appreciated by those skilled in the art, various modifications can be made to the embodiments shown in the various drawing figures and described above without departing from the spirit or scope of the invention. It is intended that the invention include all such modifications. It is not intended that the invention be limited to the illustrative embodiments shown and described. It is intended that the invention be limited in scope only by the claims appended hereto.

What is claimed is:

1. An optical switch for selective coupling wavelength components of optical signals comprising multiple wavelength components on a wavelength component by wavelength component basis, comprising:

an input port;

an output port;

an interferometer coupled to said input port and said output port, said interferometer comprising:

a first optical path receiving a first portion of each wavelength component and a second optical path receiving a second portion of each said wavelength component; and a plurality of phase modulators disposed in said first path, each phase modulator being selectively operable to phase shift a corresponding one said wavelength component first portion by a predetermined phase shift such that said interferometer either couples said wavelength component or does not couple said wavelength component from said input port to said output port.

2. Apparatus in accordance with claim 1, comprising:

a controller coupled to each of said phase modulators, said controller selecting said predetermined phase shift for each of said phase modulators.

3. Apparatus in accordance with claim 1, comprising:

a de-multiplexer, said de-multiplexer disposed in said first path and coupling each wavelength component first portion to each corresponding one optical phase modulator of said plurality of optical phase modulators.

4. Apparatus in accordance with claim 3, comprising:

a multiplexer, said multiplexer disposed in said first path and coupling each optical wavelength component first portion from each said optical phase modulator of said plurality of optical phase modulators to said first optical path.

5. Apparatus in accordance with claim 2, comprising:

a multiplexer/de-multiplexer disposed in said first path and coupling each wavelength component first portion between said first optical path and each corresponding one optical phase modulator.

6. Apparatus in accordance with claim 1, wherein:

said optical apparatus is a circulator.

7. Apparatus in accordance with claim 1, comprising a coupler, said coupler coupling said first optical path, said second optical path and said output.

8. Apparatus in accordance with claim 1, wherein:

each said optical phase modulator is a non-reciprocal phase shifter.

9. Apparatus in accordance with claim 1, wherein:

each said predetermined phase shift is a first phase shift or a second phase shift.

10. Apparatus in accordance with claim 9, wherein:

each said first phase shift is selected so that a corresponding wavelength component first portion interferes with the corresponding wavelength component second portion to produce a first interference result, said first interference result being a coupling of said corresponding wavelength component from said input port to said output port.

11. Apparatus in accordance with claim 10, wherein:

said second phase shift is selected so that said corresponding wavelength component first portion interferes with said corresponding wavelength component second portion to produce a second interference result, said second interference result being no coupling of said corresponding wavelength component from said input port to said output port.

12. Apparatus in accordance with claim 7, wherein:

said coupler is a 50/50 coupler.

13. Apparatus in accordance with claim 1, wherein:

said optical signals comprise wavelength division multiplexed signals comprising said wavelength components.

14. A method for selectively coupling multiplexed wavelength components of optical signals comprising a plurality of multiplexed wavelength components from an input port to an output port, said method comprising:

coupling said multiplexed wavelength components from said input port to an interferometer coupling first and second portions of said multiplexed wavelength components respectively onto a first optical path and a second optical path;

providing a plurality of phase modulators in said first optical path;

coupling each said wavelength component first portion to a corresponding one of said phase modulators;

controlling each phase modulator of said plurality of phase modulators individually to selectively subject each corresponding wavelength component first portion to a first or a second predetermined phase shift;

combining each wavelength component first portion with each wavelength component second portion on a wavelength by wavelength basis to produce first or second interference states each having a predetermined relationship to said first or said second predetermined phase shift, whereby each said wavelength component is coupled or is not coupled to said output port.

15. A method in accordance with claim 14, comprising:

utilizing a controller to control each said phase modulator.

16. A method in accordance with claim 14, comprising:

utilizing a phase shifter for each said phase modulator.

17. A method in accordance with claim 16, comprising:

utilizing a non-reciprocal phase shifter for each said phase modulator.

18. A method in accordance with claim 14, comprising:

separating said multiplexed wavelength components into non-multiplexed wavelength components; and coupling each non-multiplexed wavelength component on said first path to a corresponding one of said phase modulators; and subjecting each said non-multiplexed wavelength component on said first path to said first or second phase shift prior to said combining step.

19. A method in accordance with claim 18, comprising:

multiplexing together each of said non-multiplexed wavelength components on said first path after subjecting each to said first or second phase shift.

* * * * *